(12) United States Patent
Chen et al.

(10) Patent No.: US 11,536,919 B2
(45) Date of Patent: Dec. 27, 2022

(54) ELECTRONIC ASSEMBLY AND OPTICAL COMMUNICATION COMPONENT

(71) Applicants: Inventec (Pudong) Technology Corporation, Shanghai (CN); INVENTEC CORPORATION, Taipei (TW)

(72) Inventors: Hsinyu Chen, Taipei (TW); Tai-Jung Sung, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 240 days.

(21) Appl. No.: 17/029,511

(22) Filed: Sep. 23, 2020

(65) Prior Publication Data

US 2022/0066108 A1 Mar. 3, 2022

(30) Foreign Application Priority Data

Sep. 3, 2020 (CN) .......................... 202010915525.3

(51) Int. Cl.
*G02B 6/42* (2006.01)
*H01R 12/71* (2011.01)
*H04B 10/25* (2013.01)

(52) U.S. Cl.
CPC .......... *G02B 6/428* (2013.01); *G02B 6/4269* (2013.01); *H01R 12/716* (2013.01); *H04B 10/25* (2013.01)

(58) Field of Classification Search
CPC .... G02B 6/428; G02B 6/4269; H01R 12/716; H04B 10/25
USPC ........................................................... 385/39
See application file for complete search history.

(56) References Cited

U.S. PATENT DOCUMENTS

| | | | |
|---|---|---|---|
| 2011/0249980 A1* | 10/2011 | Takemoto | H04B 10/503 398/201 |
| 2016/0334591 A1* | 11/2016 | Wood | G02B 6/4206 |
| 2021/0194164 A1* | 6/2021 | Epitaux | H01R 13/631 |
| 2021/0265753 A1* | 8/2021 | Fu | H01R 12/7082 |

* cited by examiner

*Primary Examiner* — Jerry M Blevins
(74) *Attorney, Agent, or Firm* — Locke Lord LLP; Tim Tingkang Xia, Esq.

(57) ABSTRACT

An electronic assembly including first circuit board, second circuit board, and optical communication component. First circuit board includes first board and first connector. First connector is fixed on first board. Second circuit board includes second board and second connector. Second connector is fixed on second board. Optical communication component includes first communication card, first light-emitting component, second communication card, first photodetector and optical-fiber cable. First communication card is plugged into first connector. First light-emitting component is fixed on and electrically connected to first communication card. Second communication card is plugged into second connector. First photodetector is fixed on and electrically connected to second communication card. Two opposite ends of optical-fiber cable are respectively fixed to first communication card and second communication card to respectively be optically coupled to first light-emitting component and first photodetector.

9 Claims, 3 Drawing Sheets

ELECTRONIC ASSEMBLY AND OPTICAL COMMUNICATION COMPONENT

CROSS-REFERENCE TO RELATED APPLICATIONS

This non-provisional application claims priority under 35 U.S.C. § 119(a) on Patent Application No(s). 202010915525.3 filed in China, on Sep. 3, 2020, the entire contents of which are hereby incorporated by reference.

BACKGROUND OF THE INVENTION

Technical Field of the Invention

The invention relates to an electronic assembly and an optical communication component, more particularly to an electronic assembly and an optical communication component that include an optical-fiber cable.

Description of the Related Art

A typical server has an electrical cabling system to provide transmission mediums among circuit boards. With the rapid development of electronic technology, the amount of electrical cables required by a server is increased to enable high-speed transmission of large amounts of data.

However, a lot of electrical cables in a very limited internal space of the server usually interfere with the spread of cold air and therefore adversely affect heat dissipation of the server. In addition, electrical cables can become easily tangled together and thus difficult to be installed in the server.

SUMMARY OF THE INVENTION

The invention is to provide an electronic assembly and an optical communication component enabling a high-speed transmission of large amounts of data without using a lot of electrical cables.

One embodiment of this invention provides an electronic assembly including a first circuit board, a second circuit board, and an optical communication component. The first circuit board includes a first board and a first connector. The first connector is fixed on the first board. The second circuit board includes a second board and a second connector. The second connector is fixed on the second board. The optical communication component includes a first communication card, a first light-emitting component, a second communication card, a first photodetector and an optical-fiber cable. The first communication card is plugged into the first connector of the first circuit board. The first light-emitting component is fixed on and electrically connected to the first communication card. The second communication card is plugged into the second connector of the second circuit board. The first photodetector is fixed on and electrically connected to the second communication card. Two opposite ends of the optical-fiber cable are respectively fixed to the first communication card and the second communication card so as to respectively be optically coupled to the first light-emitting component and the first photodetector.

Another embodiment of this invention provides an optical communication component including a first communication card, a first light-emitting component, a second communication card, a first photodetector and an optical-fiber cable. The first light-emitting component is fixed on and electrically connected to the first communication card. The first photodetector is fixed on and electrically connected to the second communication card. Two opposite ends of the optical-fiber cable are respectively fixed to the first communication card and the second communication card so as to respectively be optically coupled to the first light-emitting component and the first photodetector.

According to the electronic assembly and the optical communication component disclosed in the above embodiments, the first light-emitting component and the first photodetector are respectively fixed on the first communication card and the second communication card, and two opposite ends of the optical-fiber cable are fixed to the first communication card and the second communication card so as to be optically coupled to the first light-emitting component and the first photodetector, respectively. Thus, while respectively plugging the first communication card and the second communication card into the first connector and the second connector, the connection and position relationship between the optical-fiber cable and the first light-emitting component is secured, and thus there is no need to further adjust the positions of the first light-emitting component and the first photodetector with respect to the optical-fiber cable during the installation of the optical communication component to the first circuit board and the second circuit board, enabling an easy and convenient installation process of the optical communication component. In addition, the optical-fiber cable occupies not too much space in the server so that the usage of the optical-fiber cable does not cause noticeable interfere with the spread of cold air, ensuring the required heat dissipation.

BRIEF DESCRIPTION OF THE DRAWINGS

The present invention will become more fully understood from the detailed description given hereinbelow and the accompanying drawings which are given by way of illustration only and thus are not limitative of the present invention and wherein.

DETAILED DESCRIPTION

Figure 1:
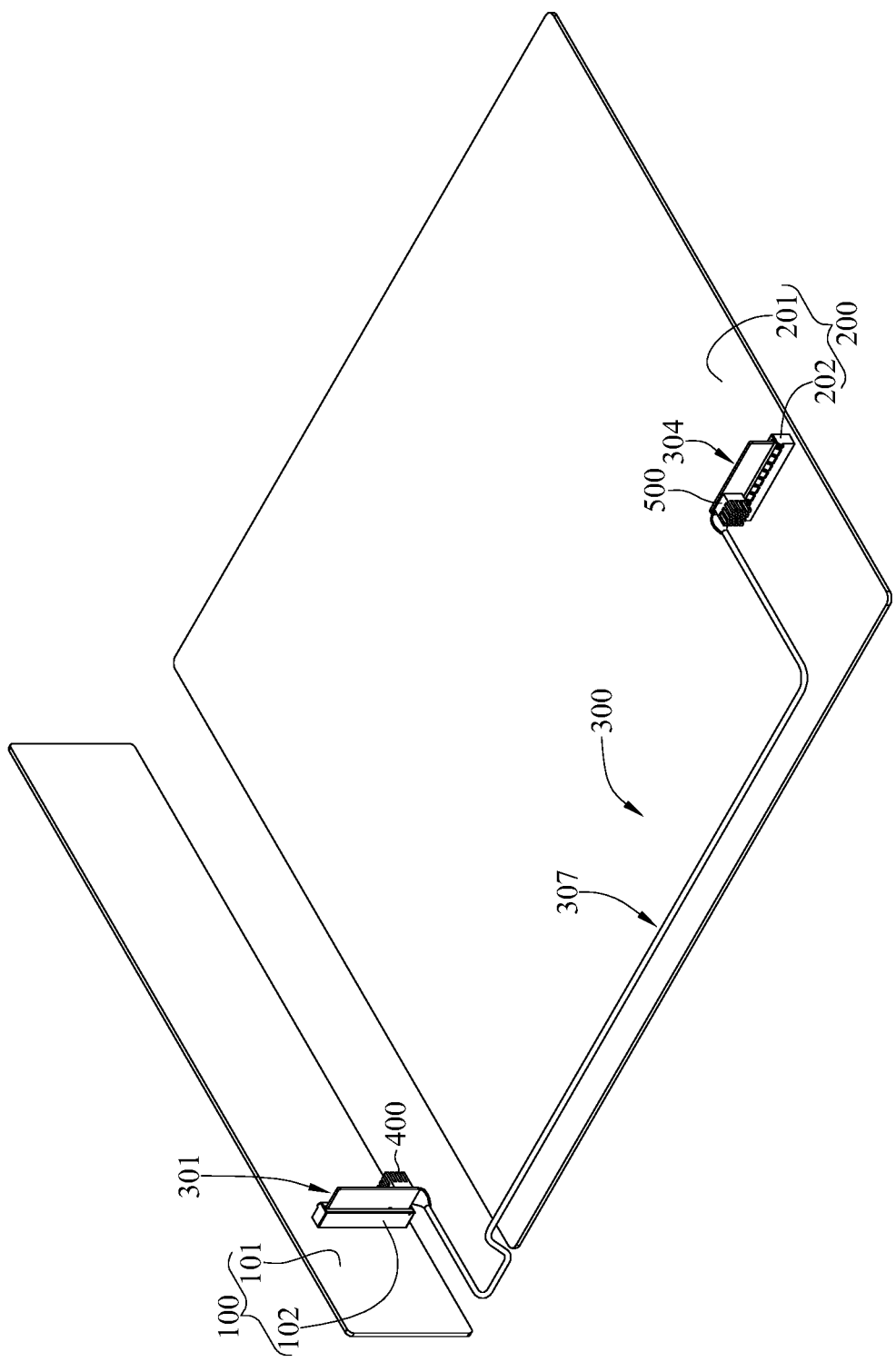
FIG. 1 is a perspective view of an electronic assembly according to one embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
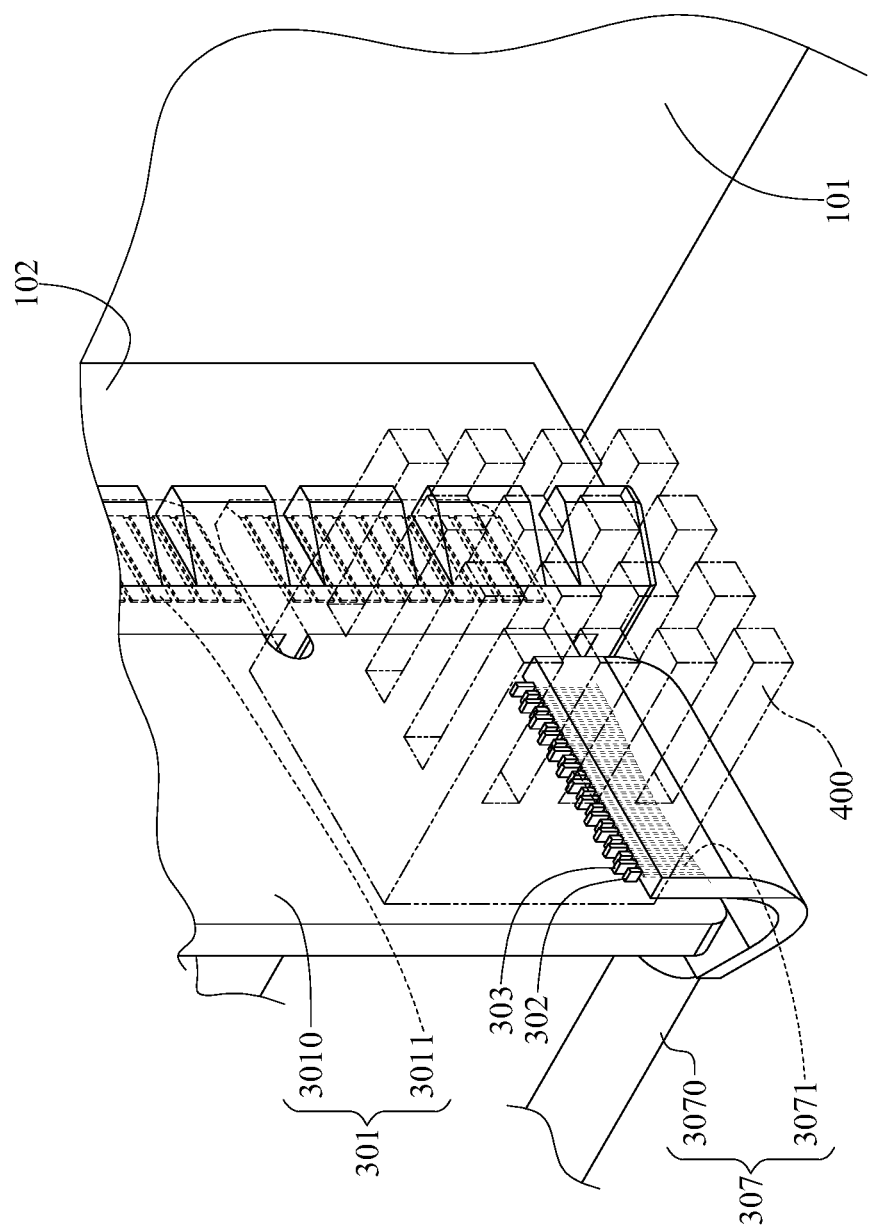
FIG. 2 is a partially enlarged perspective view of the electronic assembly in FIG. 1.
Figure 3:
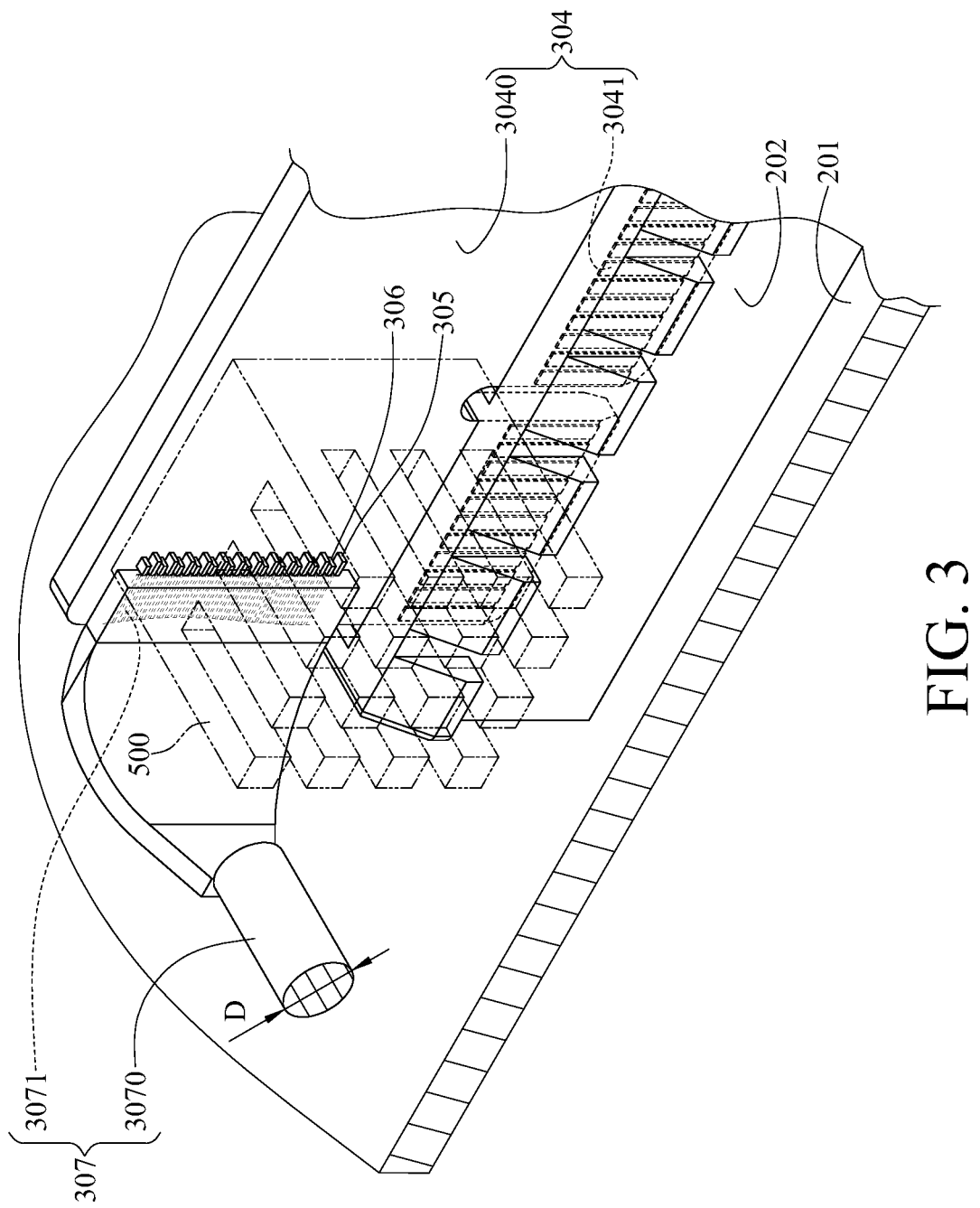
FIG. 3 is another partially enlarged perspective view of the electronic assembly in FIG. 1.

Please refer to FIG. 1 to FIG. 3, where FIG. 1 is a perspective view of an electronic assembly 10 according to one embodiment of the invention, FIG. 2 is a partially enlarged perspective view of the electronic assembly 10 in FIG. 1, and FIG. 3 is another partially enlarged perspective view of the electronic assembly 10 in FIG. 1.

In this embodiment, the electronic assembly 10 includes a first circuit board 100, a second circuit board 200, an optical communication component 300, a first heat sink 400, and a second heat sink 500. In this embodiment, the electronic assembly 10 is suitable to be installed in, for example, a server (not shown).

The first circuit board 100 includes a first board 101 and a first connector 102. The first connector 102 is fixed on the first board 101. In this embodiment, the first circuit board 100 is, for example, a disk drive back panel.

The second circuit board 200 includes a second board 201 and a second connector 202. The second connector 202 is fixed on the second board 201. In this embodiment, the second board 201 is arranged, for example, perpendicular to the first board 101 of the first circuit board 100, but the invention is not limited thereto. In other embodiments, the second board of the second circuit board may be at an acute angle to or may be parallel to the first board of the first circuit board. In this embodiment, the second circuit board 200 is, for example, a motherboard.

In this embodiment, the optical communication component 300 includes a first communication card 301, a plurality of first light-emitting components 302, a plurality of second photodetectors 303, a second communication card 304, a plurality of first photodetectors 305, a plurality of second light-emitting components 306, and an optical-fiber cable 307.

In this embodiment, the first communication card 301 includes a third board 3010 and a plurality of first metal pins 3011, where the third board 3010 is, for example, a circuit board and the first metal pins 3011 are also known as "gold fingers" that are connectors at the edge of boards. In this embodiment, the first metal pins 3011 are in the form of, for example, pads. The first metal pins 3011 are fixed on the third board 3010. The third board 3010 is plugged into the first connector 102 of the first circuit board 100 so that the first communication card 301 is electrically connected to the first connector 102 via the first metal pins 3011. The first light-emitting components 302 are fixed on and electrically connected to the third board 3010 of the first communication card 301. In this embodiment, the first light-emitting components 302 are, for example, Vertical-Cavity Surface-Emitting Lasers (VCSELs). The second photodetectors 303 are fixed on and electrically connected to the third board 3010 of the first communication card 301. Furthermore, in this embodiment, the first light-emitting components 302 and the second photodetectors 303 are fixed on the third board 3010 of the first communication card 301 and arranged in an alternate manner. That is, on the third board 3010, any one of the first light-emitting components 302 is located adjacent to at least one second photodetector 303.

In this embodiment, the second communication card 304 includes a fourth board 3040 and a plurality of second metal pins 3041, where the fourth board 3040 is, for example, a circuit board and the second metal pins 3041 are also known as "gold fingers" that are connectors at the edge of boards. In this embodiment, the second metal pins 3041 are in the form of, for example, pads. The second metal pins 3041 are fixed on the fourth board 3040. The fourth board 3040 is plugged into the second connector 202 of the second circuit board 200 so that the second communication card 304 is electrically connected to the second connector 202 via the second metal pins 3041. The first photodetectors 305 are fixed on and electrically connected to the fourth board 3040 of the second communication card 304. The second light-emitting components 306 are fixed on and electrically connected to the fourth board 3040 of the second communication card 304. In this embodiment, the second light-emitting components 306 are, for example, VCSELs. Moreover, in this embodiment, the first photodetectors 305 and the second light-emitting components 306 are fixed on the fourth board 3040 of the second communication card 304 and are arranged in an alternate manner. That is, on the fourth board 3040, any one of the first photodetectors 305 is located adjacent to at least one second light-emitting component 306.

It is noted that, in other embodiments, the first light-emitting components and the second light-emitting components may be light-emitting diodes or other suitable types of light-emitting components.

In addition, in other embodiments, the first light-emitting components may be adjacent to one another on the third board of the first communication card and the second photodetectors may be adjacent to one another on the third board of the first communication card. Also, in other embodiments, the first photodetectors may be adjacent to one another on the fourth board of the second communication card and the second light-emitting component may be adjacent to one another on the fourth board of the second communication card. Furthermore, in other embodiments, the first metal pins and the second metal pins may be in the form of cylinders.

In this embodiment, the optical-fiber cable 307 includes a sleeve 3070 and a plurality of optical fibers 3071. The optical fibers 3071 are accommodated in the sleeve 3070. Two opposite ends of the sleeve 3070 are fixed on the third board 3010 of the first communication card 301 and the fourth board 3040 of the second communication card 304, respectively. Ends of the optical fibers 3071 are held in position by one end of the sleeve 3070 so that the optical fibers 3071 are aligned with and optically coupled to the first light-emitting components 302 and the second photodetectors 303. The other ends of the optical fibers 3071 are held in position by the other end of the sleeve 3070 so that the optical fibers 3071 are aligned with and optically coupled to the first photodetectors 305 and the second light-emitting components 306. In other embodiments, two opposite ends of each optical fiber may respectively be directly fixed on the third board of the first communication card and the fourth board of the second communication card without being held by the sleeve. Moreover, there may be, for example, 48 optical fibers 3071 accommodated in the sleeve 3070. Further, as shown in FIG. 3, in this embodiment, a diameter D of the sleeve 3070 of the optical-fiber cable 307 is, for example, 3 millimeters (mm). Also, as shown in FIG. 3, in this embodiment, the axial cross-section of the sleeve 3070 of the optical-fiber cable 307 is in, for example, a circular shape, such that the optical-fiber cable 307 can be easily bent to desired direction when being installed in the server. Moreover, in this embodiment, the volume of the optical-fiber cable 307 is, for example, one-sixteenth of that of a regular copper electrical cable.

The first heat sink 400 is fixed on the third board 3010 of the first communication card 301 and is in thermal contact with the first light-emitting components 302 and the second photodetectors 303 in order to effectively dissipate the heat generated by the first light-emitting components 302 and the second photodetectors 303. The second heat sink 500 is fixed on the fourth board 3040 of the second communication card 304 and is in thermal contact with the first photodetectors 305 and the second light-emitting components 306 in order to effectively dissipate the heat generated by the first photodetectors 305 and the second light-emitting components 306. However, in other embodiments, the electronic assembly may not include the first heat sink and the second heat sink.

Specifically, the first circuit board 100 controls the first light-emitting component 302 to emit light via the first communication card 301. The light emitted from the first light-emitting component 302 is transmitted to the first photodetector 305 via one or more optical fibers 3071 of the optical-fiber cable 307, and the first photodetector 305 converts the received light into electrical signal and transmit it to the second circuit board 200 via the second communication card 304, enabling a signal transmission from the first circuit board 100 to the second circuit board 200.

Similarly, the second circuit board 200 controls the second light-emitting component 306 to emit light via the second communication card 304. The light emitted from the second light-emitting component 306 is transmitted to the second photodetector 303 via one or more optical fibers 3071 of the optical-fiber cable 307, and the second photodetector 303 converts the received light into electrical signal and transmits it to the first circuit board 100 via the first communication card 301, enabling a signal transmission from the second circuit board 200 to the first circuit board 100.

In this embodiment, with the help of the first communication card 301 and the second communication card 304, the connections and position relationships among the first light-emitting components 302, the second photodetectors 303, the first communication card 301, the first photodetectors 305, the second light-emitting components 306, the second communication card 304, and the optical-fiber cable 307 are secured during the installation to the first circuit board 100 and the second circuit board 200. Thus, the installation of the optical communication component 300 to the first circuit board 100 and the second circuit board 200 may only involve plugging the first communication card 301 and the second communication card 304 into the first connector 102 and the second connector 202, and thus no calibration or adjustment is required. This prevents the predetermined transmission efficiency of the optical communication component 300 from being affected by the assembling tolerance.

It is noted that, in other embodiments, the optical communication component may also include only one first light-emitting component, one second photodetector, one first photodetector, and one second light-emitting component. Alternatively, in still other embodiments, the optical communication component may only include one first light-emitting component and one first photodetector and may not include the second light-emitting component and the second photodetector.

In some embodiments of the invention, the server where the electronic assembly 10 is installed may be served as a server particularly for artificial intelligence (AI) computation, edge computation, or be served as a 5G server, cloud computing server, or internet of vehicle server.

According to the electronic assembly and the optical communication component disclosed in the above embodiments, the first light-emitting component and the first photodetector are respectively fixed on the first communication card and the second communication card, and two opposite ends of the optical-fiber cable are fixed to the first communication card and the second communication card so as to be optically coupled to the first light-emitting component and the first photodetector, respectively. Thus, while respectively plugging the first communication card and the second communication card into the first connector and the second connector, the connection and position relationship between the optical-fiber cable and the first light-emitting component is secured, and thus there is no need to further adjust the positions of the first light-emitting component and the first photodetector with respect to the optical-fiber cable during the installation of the optical communication component to the first circuit board and the second circuit board, enabling an easy and convenient installation process of the optical communication component. In addition, the optical-fiber cable occupies not too much space in the server so that the usage of the optical-fiber cable does not cause noticeable interfere with the spread of cold air, ensuring the required heat dissipation.

It will be apparent to those skilled in the art that various modifications and variations can be made to the present invention. It is intended that the specification and examples be considered as exemplary embodiments only, with a scope of the invention being indicated by the following claims and their equivalents.

What is claimed is:

1. An electronic assembly, comprising:
a first circuit board, the first circuit board comprising a first board and a first connector, and the first connector fixed on the first board;
a second circuit board, the second circuit board comprising a second board and a second connector, and the second connector fixed on the second board; and
an optical communication component, the optical communication component comprising:
a first communication card, the first communication card plugged into the first connector of the first circuit board;
a first light-emitting component, the first light-emitting component fixed on and electrically connected to the first communication card;
a second communication card, the second communication card plugged into the second connector of the second circuit board;
a first photodetector, the first photodetector fixed on and electrically connected to the second communication card; and
an optical-fiber cable, two opposite ends of the optical-fiber cable respectively fixed to the first communication card and the second communication card so as to respectively be optically coupled to the first light-emitting component and the first photodetector;
wherein the optical-fiber cable comprises a sleeve and a plurality of optical fibers, the plurality of optical fibers are accommodated in the sleeve, two opposite ends of the sleeve are respectively fixed to the first communication card and the second communication card, and two opposite ends of the plurality of optical fibers are respectively held in position by two opposite ends of the sleeve so as to be optically coupled to the first light-emitting component and the first photodetector, respectively.

2. The electronic assembly according to claim 1, wherein the first light-emitting component is a Vertical-Cavity Surface-Emitting Laser.

3. The electronic assembly according to claim 1, wherein the second board of the second circuit board is arranged perpendicular to the first board of the first circuit board.

4. The electronic assembly according to claim 1, further comprising a first heat sink, wherein the first heat sink is fixed on the first communication card and is in thermal contact with the first light-emitting component.

5. The electronic assembly according to claim 1, wherein the optical communication component further comprises a second light-emitting component and a second photodetector, the second light-emitting component is fixed on and electrically connected to the second communication card, and the second photodetector is fixed on and electrically connected to the first communication card.

6. The electronic assembly according to claim 5, wherein an amount of the first light-emitting component, an amount of the second light-emitting component, an amount of the first photodetector and an amount of the second photodetector are plural, the plurality of first light-emitting components and the plurality of second photodetectors are fixed on the first communication card and arranged in an alternate manner, and the plurality of first photodetectors and the plurality of second light-emitting components are fixed on the second communication card and arranged in an alternate manner.

7. The electronic assembly according to claim 5, further comprising a first heat sink and a second heat sink, wherein the first heat sink is fixed to the first communication card and in thermal contact with the first light-emitting component, and the second heat sink is fixed on the second communication card and is in thermal contact with the second light-emitting component.

8. The electronic assembly according to claim 1, wherein the first communication card comprises a third board and a plurality of first metal pins, the plurality of first metal pins are fixed on the third board, the first communication card is electrically connected to the first connector via the plurality of first metal pins, the second communication card comprises a fourth board and a plurality of second metal pins, the plurality of second metal pins are fixed on the fourth board, and the second communication card is electrically connected to the second connector via the plurality of second metal pins.

9. An optical communication component, comprising:
a first communication card;
a first light-emitting component, the first light-emitting component fixed on and electrically connected to the first communication card;
a second communication card;
a first photodetector, the first photodetector fixed on and electrically connected to the second communication card; and
an optical-fiber cable, two opposite ends of the optical-fiber cable respectively fixed to the first communication card and the second communication card so as to respectively be optically coupled to the first light-emitting component and the first photodetector;
wherein the optical-fiber cable comprises a sleeve and a plurality of optical fibers, the plurality of optical fibers are accommodated in the sleeve, two opposite ends of the sleeve are respectively fixed to the first communication card and the second communication card, and two opposite ends of the plurality of optical fibers are respectively held in position by two opposite ends of the sleeve so as to be optically coupled to the first light-emitting component and the first photodetector, respectively.

* * * * *